(12) United States Patent
Pan et al.

(10) Patent No.: US 6,766,383 B1
(45) Date of Patent: Jul. 20, 2004

(54) PACKET-BASED DIRECT MEMORY ACCESS

(75) Inventors: Shien-Tai Pan, Laguna Niguel, CA (US); Chung-Jue Chen, Irvine, CA (US); Mark E. Miller, Mission Viejo, CA (US); David P. Braun, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 457 days.

(21) Appl. No.: 09/672,160

(22) Filed: Sep. 27, 2000

Related U.S. Application Data

(60) Provisional application No. 60/156,260, filed on Sep. 27, 1999.

(51) Int. Cl.[7] ............................................. G06F 13/28
(52) U.S. Cl. ............................ 710/22; 710/23; 710/29; 710/33; 709/212
(58) Field of Search ...................... 710/22–24, 33–35; 709/212

(56) References Cited

U.S. PATENT DOCUMENTS

| | | | | |
|---|---|---|---|---|
| 5,307,345 A | * | 4/1994 | Lozowick et al. | 370/428 |
| 5,594,702 A | * | 1/1997 | Wakeman et al. | 365/230.05 |
| 5,826,106 A | * | 10/1998 | Pang | 710/25 |
| 6,067,408 A | * | 5/2000 | Runaldue et al. | 710/307 |
| 6,122,680 A | * | 9/2000 | Holm et al. | 710/52 |
| 6,154,793 A | * | 11/2000 | MacKenna et al. | 710/23 |
| 6,188,699 B1 | * | 2/2001 | Lang et al. | 370/463 |
| 6,415,348 B1 | * | 7/2002 | Mergard et al. | 710/305 |
| 6,430,727 B1 | * | 8/2002 | Warren | 716/4 |
| 6,466,584 B1 | * | 10/2002 | Maxwell et al. | 370/465 |
| 6,477,599 B1 | * | 11/2002 | Suzuki et al. | 710/241 |

* cited by examiner

*Primary Examiner*—Jeffrey Gaffin
*Assistant Examiner*—Evon Sorrell
(74) *Attorney, Agent, or Firm*—Christopher J. Rourk; Akin Gump Strauss Hauer & Feld, LLP

(57) ABSTRACT

Packet-Based Direct Memory Access. The present invention overcomes the oftentimes hardware consumptive and complex implementation of conventional direct memory access (DMA) that employs descriptors. The descriptors that must are employed by conventional DMA must be set up by software, and the handshaking between the hardware and software is typically very cumbersome. The packet-based DMA performed in accordance with the present invention is operable and adaptable to various types of cell-based DMA modes. A flow control regulator, or flow control state machine, is used to control the packet-based DMA performed in accordance with the present invention. Two different multiplexors (MUXs) are employed, one for each of the transmit and the receive packet-based DMA transfers, to select the various cases of packet-based DMA. The present invention is operable within various modes including asynchronous transfer mode (ATM) cell-based asynchronous digital subscriber loop (ADSL) applications. An efficient implementation using registers to control the packet-based DMA transfers is provided by the present invention.

19 Claims, 7 Drawing Sheets

PACKET-BASED DIRECT MEMORY ACCESS

CROSS REFERENCE TO RELATED APPLICATIONS

The present application is based on and claims priority to U.S. Provisional Patent Application Serial No. 60/156,260 entitled "Direct Memory Access Controller," filed Sep. 27, 1999.

BACKGROUND

1. Technical Field

The present invention relates generally to memory management; and, more particularly, it relates to packet-based direct memory access.

2. Related Art

Direct Memory Access (DMA) is a special hardware added to many computer systems to allow data transfers between memory and an input/output (I/O) device being handled without intervention by the central processing unit (CPU). Typically, the CPU will first set up the DMA controller (DMAC) by programming some registers containing a memory address and the transfer length (number of bytes to be transferred). The DMAC behaves as a bus master and the I/O device provides transfer controls to the DMAC in forms of predefined commands. To effectively utilize the bus bandwidth and minimize the software overhead, several DMA architectures were invented. Two such examples of DMA architectures are described in "Descriptor Based DMA Architecture," Apple computer and in "Descriptor-Based DMA", IBM RS/6000.

These conventional and traditional methods generally use descriptors to provide control information (e.g., the transfer length) to the I/O device. These conventional methods are most effective for transfers with longer block lengths, like in many stream-based communications. However, its advantage diminishes as the transfer length is shortened. In most of asynchronous transfer mode (ATM) cell-based asynchronous digital subscriber loop (ADSL) applications, data are transferred in number of fixed-length packets within a computer system. The packets are typically 56 or 64 bytes in size. The packets will eventually be converted to 53-byte cells for transmission over an ATM communication channel. Those solutions employed using a universal serial bus (USB) are also packet-based. The transfer control in the conventional manner of DMA described above inherently requires descriptor information.

The descriptors employed in conventional DMA include any number of various types of information. For example, a beginning address, a data transfer byte length, or a receive data byte count, DMA control status, and other information necessary to perform conventional DMA can be very large in terms of size and very complex in terms of implementation. Other DMA methods, including scatter-gather DMA systems additionally require even more information in their descriptors, enabling the gathering of various portions of data from various locations in the memory.

Further limitations and disadvantages of conventional and traditional systems will become apparent to one of skill in the art through comparison of such systems with the present invention as set forth in the remainder of the present application with reference to the drawings.

SUMMARY OF THE INVENTION

Various aspects of the present invention can be found in a packet-based direct memory access system. The packet-based direct memory access system includes a microchip circuitry, a number of registers including an increment register, a decrement register, and a pending register, and a flow control state machine. The microchip circuitry contains the registers, and it is operable to perform direct memory access of packet-based data. The packet-based data is either transferred to the device from the microchip circuitry to the device or received by the microchip circuitry from the device. The packet-based data is broken into a number of fixed length packets. The flow control state machine is operable control whether a packet is transmitted to the device from the microchip circuitry or whether a packet is received by the microchip circuitry from the device. The flow control state machine is operable to modify values stored in the increment register and the pending register during the transmission to the device from the microchip circuitry. The flow control state machine is also operable to modify values stored in the decrement register and the pending register during the receipt by the microchip circuitry from the device.

In certain embodiments of the invention, the flow control state machine is operable to control an increase of a value stored in the transmit pending register by a value stored in the increment register when no packet is transmitted to the device from the microchip circuitry and the increment register is updated. The flow control state machine is operable to control a decrease of a value stored in the transmit pending register by one when a packet is transmitted to the device from the microchip circuitry and the increment register is not updated. The flow control state machine is also operable to control a decrease of a value stored in the transmit pending register by a predetermined value and increases the value stored in the transmit pending register by a value stored in the increment register when a packet is transmitted to the device from the microchip circuitry and the increment register is updated.

The flow control state machine is operable to control a decrease of a value stored in the receive pending register by a value stored in the decrement register when no packet is received by the microchip circuitry from the device and the decrement register is updated. The flow control state machine is operable to control an increase of a value stored in the receive pending register by one when a packet is received by the microchip circuitry from the device and the decrement register is not updated. The flow control state machine is also operable to control an increase of a value stored in the receive pending register by one and decreases the value stored in the receive pending register by a value stored in the decrement register when a packet is received by the microchip circuitry from the device and the decrement register is updated.

The microchip circuitry also includes a direct memory access interface and the flow control state machine itself. The direct memory access interface is operable to perform receipt of the packet-based data by the microchip circuitry from the device as well as transmission of the packet-based data from the microchip circuitry to the device. The device is any number of devices including an asynchronous digital subscriber loop modem. In various embodiments of the invention, the microchip circuitry also includes a system bus to which a number of system devices are communicatively coupled, and a peripheral bus. A communication interface circuitry is communicatively coupled to the peripheral bus. The communication interface circuitry itself contains a direct memory access interface and the flow control state machine.

The packet-based data is any type of packet-based data including asynchronous transfer mode cell-based asynchronous digital subscriber loop data and universal serial bus data.

Other aspects of the present invention can be found in a packet-based direct memory access system. The packet-based direct memory access system includes a direct memory access interface, a flow control regulator, and an increment register, a decrement register, a transmit pending register, and a receive pending register. The direct memory access interface is operable to transmit and receive packet-based data to and from a device. The flow control regulator is communicatively coupled to the direct memory access interface and is operable to control the state of receipt of a packet of the packet-based data and transmission of a packet of the packet-based data. The flow control regulator uses the increment register and the transmit pending register to determine how to control transmission of a packet of the packet-based data, and the flow control regulator uses the decrement register and the receive pending register to determine how to control receipt of a packet of the packet-based data.

The device is any number of devices including an asynchronous digital subscriber loop modem. The flow control regulator employs a hardware assisted handshaking protocol engine to obviate the need for descriptors in performing the packet-based direct memory access. The packet-based direct memory access system includes a microchip circuitry that itself contains a communication interface circuitry. That communication interface circuitry includes the direct memory access interface circuitry and the flow control regulator. The flow control regulator is a flow control state machine in some embodiments.

The packet-based data is any type of packet-based data including asynchronous transfer mode cell-based asynchronous digital subscriber loop data as well as universal serial bus data.

Other aspects of the present invention can be found in a method to perform packet-based direct memory access. The method involves determining whether a packet of the packet-based data has been transmitted, determining whether a packet of the packet-based data has been received, selectively controlling values stored in the increment register and a transmit pending register based on transmission of a packet of the packet-based data, and selectively controlling values stored in the decrement register and the receive pending register based on receipt of the packet of the packet-based data.

In certain embodiments of the invention, the method also involves determining when the increment register is updated, increasing a value stored in the transmit pending register by a value stored in the increment register when no packet is transmitted and the increment register is updated, decreasing a value stored in the transmit pending register by one when a packet is transmitted and the increment register is not updated, and decreasing a value stored in the transmit pending register by one and increasing the value stored in the transmit pending register by a value stored in the increment register when a packet is transmitted and the increment register is updated.

Moreover, the method may also involve determining when the decrement register is updated, decreasing a value stored in the receive pending register by a value stored in the decrement register when no packet is received and the decrement register is updated, increasing a value stored in the receive pending register by one when a packet is received and the decrement register is not updated, and increasing a value stored in the receive pending register by one and decreasing the value stored in the receive pending register by a value stored in the decrement register when a packet is received and the decrement register is updated.

The packet-based data is any type of packet-based data including asynchronous transfer mode cell-based asynchronous digital subscriber loop data as well as universal serial bus data.

Other aspects, advantages and novel features of the present invention will become apparent from the following detailed description of the invention when considered in conjunction with the accompanying drawings.

BRIEF DESCRIPTION OF THE DRAWINGS

A better understanding of the present invention can be obtained when the following detailed description of various exemplary embodiments are considered in conjunction with the following drawings.

DETAILED DESCRIPTION OF THE INVENTION

The present invention provides for packet-based direct memory access (DMA) with an assisted flow control regulator. The flow control regulator is a flow control state machine from certain perspectives. Packet-based DMA, performed in accordance with the present invention, does not require the conventionally-needed descriptor information that is requisite in most systems performing DMA. The DMA flow control is easily handled through a hardware assisted handshaking protocol engine called the "flow control regulator," or the flow control state machine mentioned above.

Figure 1:
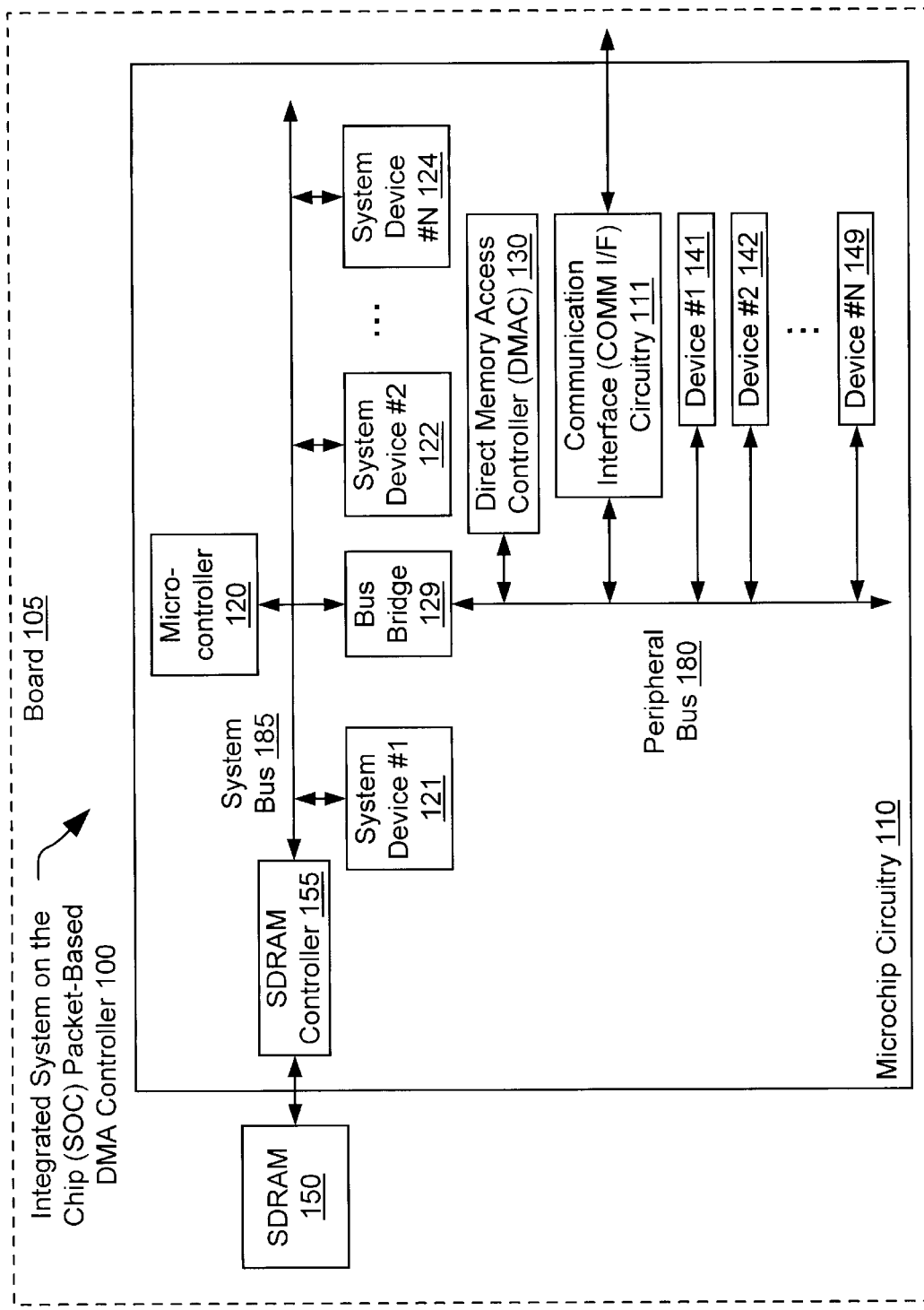
FIG. 1 is a system diagram illustrating an embodiment of an integrated system on the chip (SOC) packet-based direct memory access (DMA) controller built in accordance with the present invention.

FIG. 1 is a system diagram illustrating an embodiment of an integrated system on the chip (SOC) packet-based direct memory access (DMA) controller built in accordance with the present invention. The integrated SOC packet-based DMA controller 100 is shown as being implemented on a board 105 in the FIG. 1. The integrated SOC packet-based DMA controller 100 is operable to be implemented on other platforms as well in various embodiments of the invention. The board 105 itself contains, among other things, a synchronous dynamic random access memory (SDRAM) 150 that is communicatively coupled to a microchip circuitry 110. The microchip circuitry 110 itself contains, among other things, a vertical, peripheral bus 180 and a horizontal system bus 185. Communicatively coupled to the system bus 185 are a synchronous dynamic random access memory (SDRAM) controller 155, a micro-controller 120, and a bus bridge 129.

In addition, an indefinite number of system devices are communicatively coupled to the system bus 185 on the microchip circuitry 110. The indefinite number of system devices are shown as a system device #1 121, a system device #2 122, . . . , and a system device #N 124. The bus bridge 129 communicatively couples the system bus 185 and the peripheral bus 180. The peripheral bus 180 also communicatively couples each of a direct memory access controller (DMAC) 130, a communication interface (COMM I/F) circuitry 111, and an indefinite number of other devices. The indefinite number of device is a single device as shown by a device #1 141 in certain embodiments of the invention. In others, the indefinite number of device is a number of devices shown as a device #1 141, a device #2 142, . . . , and a device #N 149. The COMM I/F circuitry 111 is operable to communicatively couple the microchip circuitry 110, via the peripheral bus 180, to any other circuitry on the board 105 including peripheral devices.

Figure 2A:
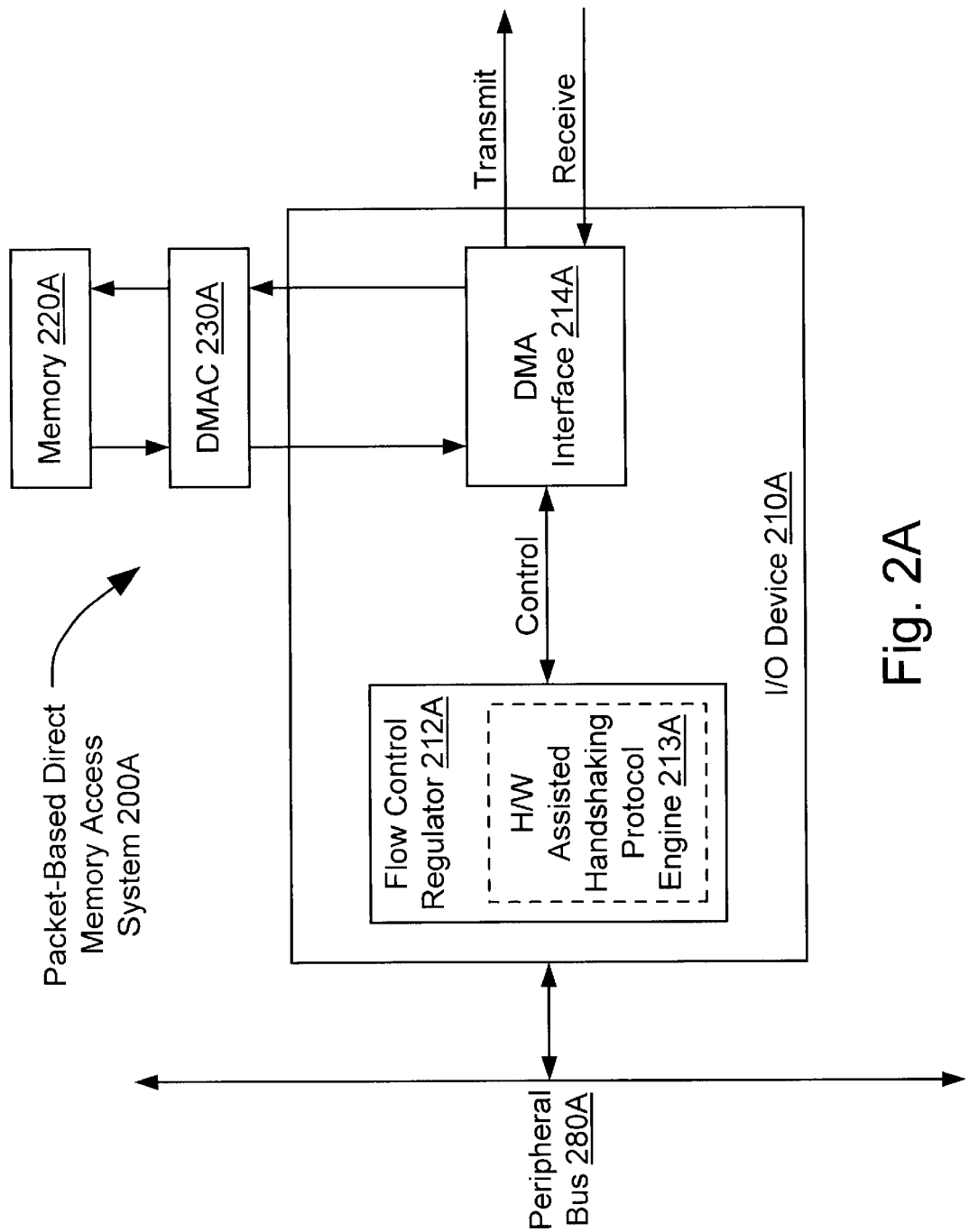
FIG. 2A is a system diagram illustrating an embodiment of a packet-based direct memory access (DMA) system built in accordance with the present invention.

FIG. 2A is a system diagram illustrating an embodiment of a packet-based direct memory access (DMA) system 200A built in accordance with the present invention. The packet-based DMA system 200A itself contains, among other things, an input/output device (I/O) device 210A having a flow control regulator 212A and a DMA interface 214A. In certain embodiments of the invention, the flow control regulator 212A employs a hardware handshaking protocol engine 213A. The hardware handshaking protocol engine 213A ensures that no descriptor information is required to perform the packet-based DMA. In addition, given that no descriptor information is required, this is one less operation that any start-up-initialization software must perform before doing any packet-based DMA when compared to conventional packet-based DMA systems.

The I/O device 210A is communicatively coupled to a peripheral bus 280A. From some perspectives, the packet-based DMA system 200A is viewed as being one embodiment of the COMM I/F circuitry 111 shown above in the FIG. 1. The DMA interface 214A is also speech signal to a direct memory access controller (DMAC) 230A that is also communicatively coupled to a memory 220A. The DMA interface 214A is operable to transmit and receive packet-based data to any number of devices in accordance with the present invention.

Figure 2B:
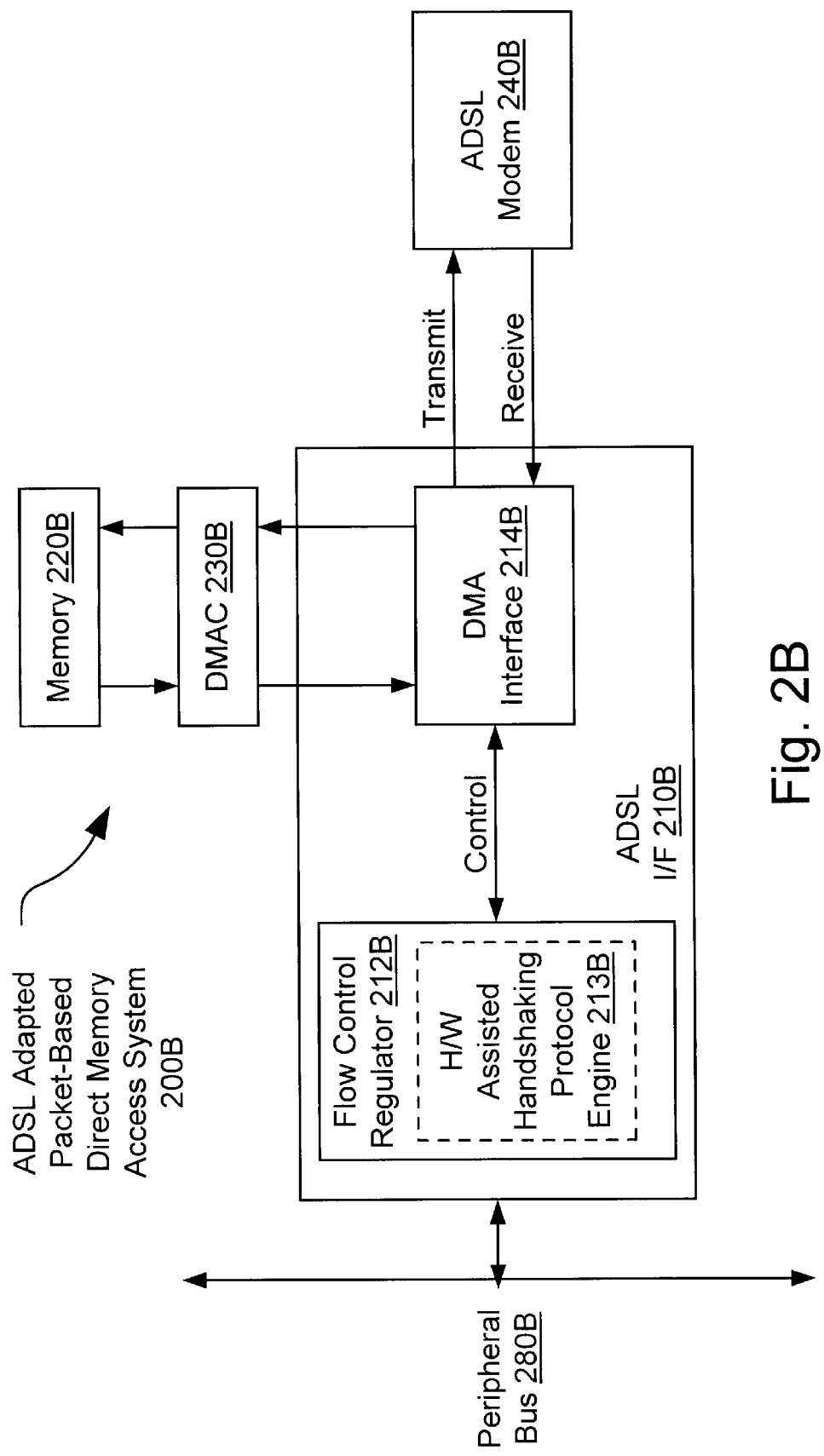
FIG. 2B is a system diagram illustrating an embodiment of an asynchronous digital subscriber loop (ADSL) packet-based direct memory access (DMA) system built in accordance with the present invention.

FIG. 2B is a system diagram illustrating an embodiment of an asynchronous digital subscriber loop (ADSL) packet-based direct memory access (DMA) system built in accordance with the present invention. The ADSL packet-based DMA system 200B itself contains, among other things, an ADSL interface (I/F) 210B having a flow control regulator 212B and a DMA interface 214B. In certain embodiments of the invention, the flow control regulator 212B employs a hardware handshaking protocol engine 213B. The hardware handshaking protocol engine 213B ensures that no descriptor information is required to perform the packet-based DMA. In addition, given that no descriptor information is required, this is one less operation that any start-up-initialization software must perform before doing any packet-based DMA when compared to conventional packet-based DMA systems.

The ADSL I/F 210B is communicatively coupled to a peripheral bus 280B. From some perspectives, the ADSL packet-based DMA system 200B is viewed as being one embodiment of the COMM I/F circuitry 111 shown above in the FIG. 1. The DMA interface 214B is also speech signal to a direct memory access controller (DMAC) 230B that is also communicatively coupled to a memory 220B. The DMA interface 214B is operable to transmit and receive packet-based data to an ADSL modem 240B in accordance with the present invention.

Figure 3:
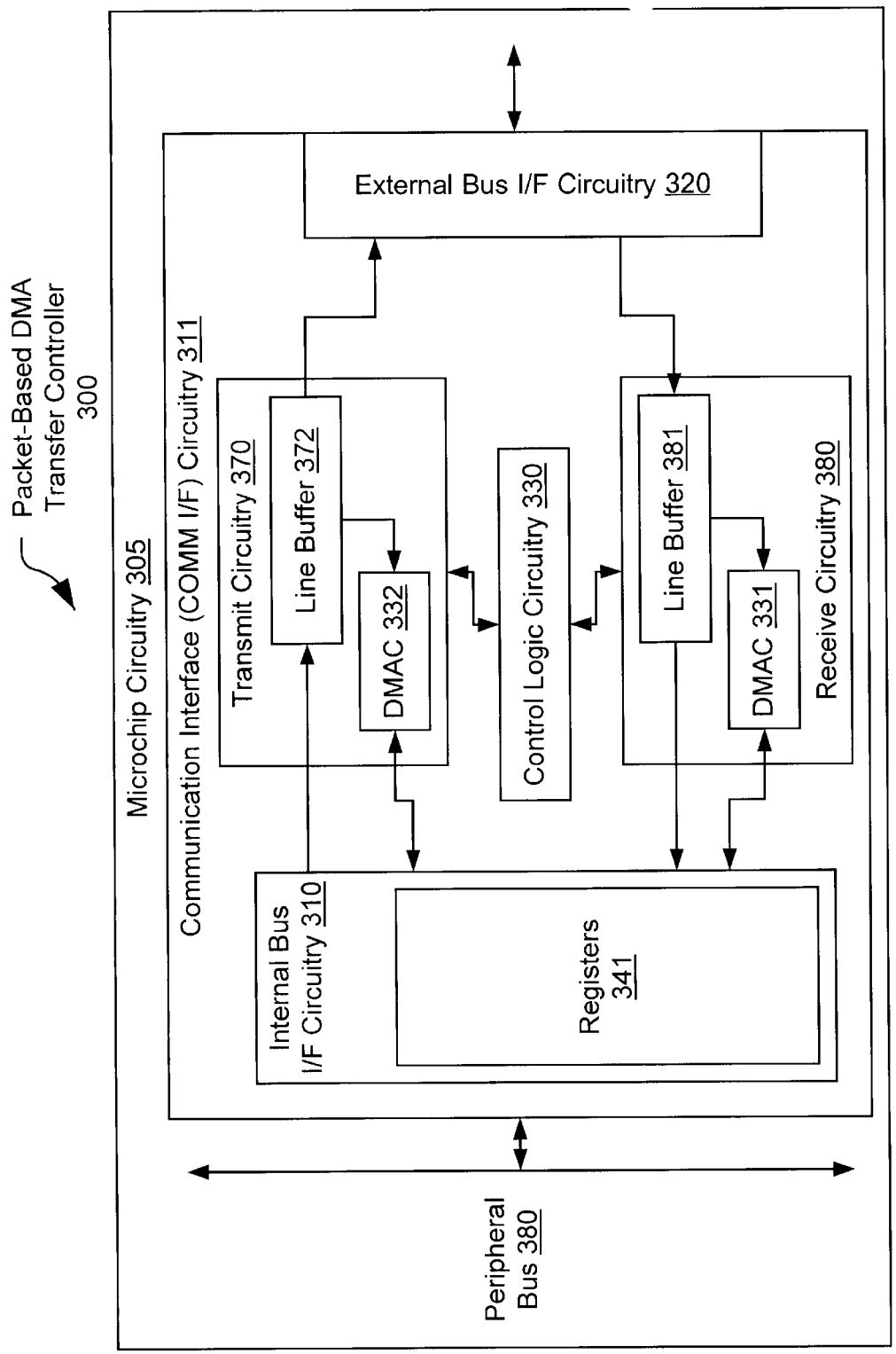
FIG. 3 is a system diagram illustrating an embodiment of a packet-based direct memory access (DMA) transfer controller built in accordance with the present invention.

FIG. 3 is a system diagram illustrating an embodiment of a packet-based direct memory access (DMA) transfer controller 300 built in accordance with the present invention. The packet-based DMA transfer controller 300 is shown as being implemented on a microchip circuitry 305 in the FIG. 3. The packet-based DMA transfer controller 300 is operable to be implemented on other platforms as well in various embodiments of the invention. The microchip circuitry 305 itself contains, among other things, a communication interface (COMM I/F) circuitry 311. The COMM I/F circuitry 311 is communicatively coupled to a peripheral bus 380 that is also resident on the microchip circuitry 305. Resident on the COMM I/F circuitry 311 are control logic circuitry 330 that is communicatively coupled to each of a transmit circuitry 370 and a receive circuitry 380. The transmit circuitry 370 itself contains, among other things, a line buffer 372 and a direct memory access controller (DMAC) 332. The receive circuitry 380 itself contains, among other things, a line buffer 381 and a DMAC 331. An internal bus interface (I/F) circuitry 310 is operable to transfer data to the line buffer 372 of the transmit circuitry 370 as governed by the DMAC 332.

Similarly, the internal bus I/F circuitry 310 is operable to receive data from the line buffer 381 of the receive circuitry 380 as governed by the DMAC 331. The internal bus I/F circuitry 310 itself contains, among other things, an area of real estate dedicated to registers 341. As will be shown below in various embodiments of the invention, the registers 341 are implemented for a variety of different purposes including an increment register, a decrement register, and a pending register. The line buffer 372 of the transmit circuitry 370 and the line buffer 381 of the receive circuitry 381 are each operable to communicate with an external bus interface (I/F) circuitry 320 that is operable to communicatively couple the COMM I/F circuitry 311 to any other circuitry on the microchip circuitry 305.

Figure 4:
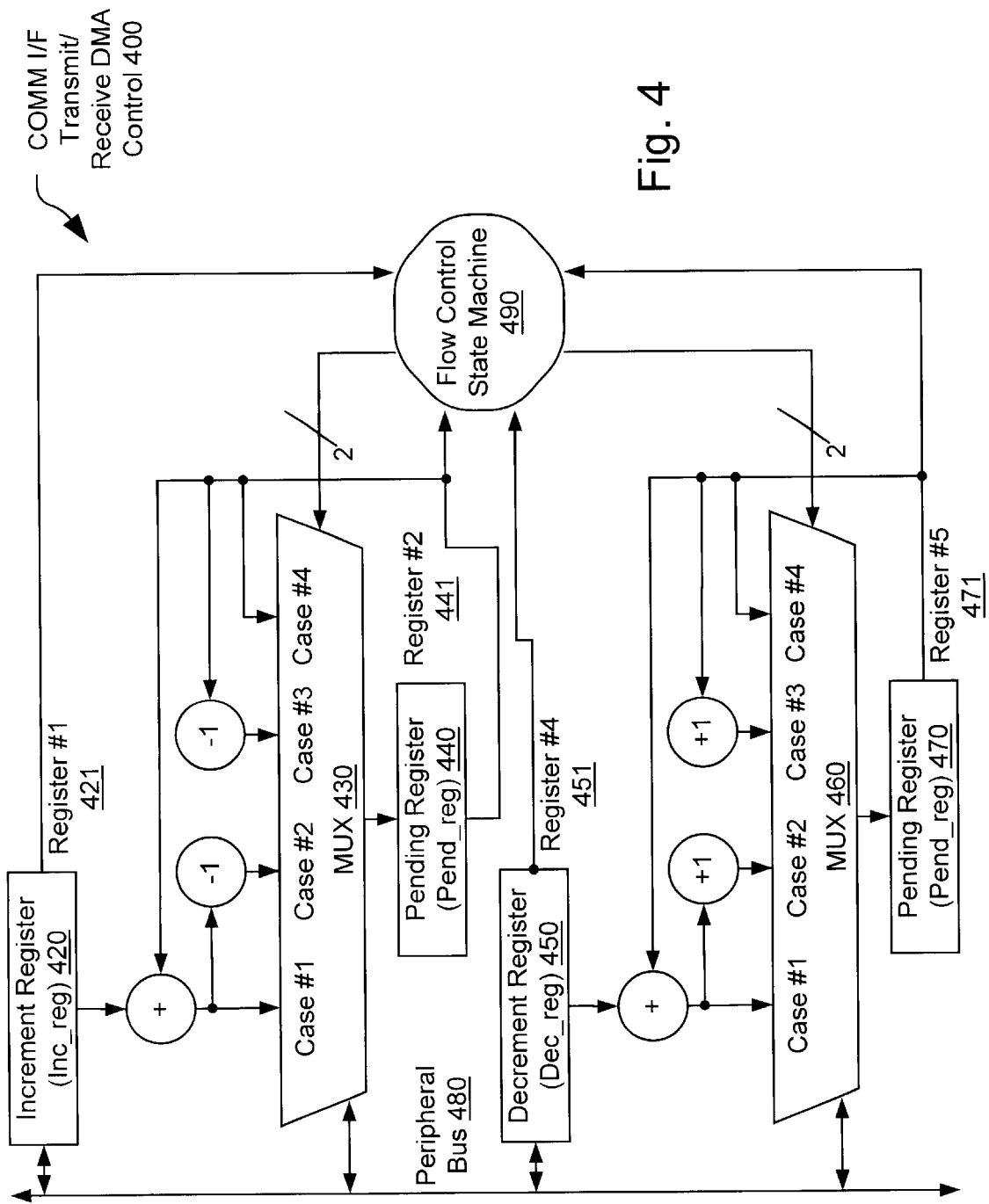
FIG. 4 is a functional block diagram illustrating communication interface (COMM I/F) transmit and receive direct memory access (DMA) control performed in accordance with the present invention.

FIG. 4 is a functional block diagram illustrating communication interface (COMM I/F) transmit and receive direct memory access (DMA) control performed in accordance with the present invention. An increment register (Inc_reg) 420 is employed, shown in a hardware implementation as a register #1 421. In addition, a pending register (Pend_reg) 440 and is also employed within the COMM I/F transmit and receive DMA control 400, shown in a hardware implementation as a register #2 441. A multiplexor (MUX) 430 is operable to accommodate four different transmit cases that occur in the operation of the COMM I/F transmit and receive DMA control 400. Mathematical addition, as well as incrementing and decrementing, are all performed in accordance with the present invention as shown in the FIG. 4.

A software that is operable to perform the COMM I/F transmit DMA control 400 writes the increment register (Inc_reg) 420 with the number of valid packets to be transmitted. The register #1 421 is operable as a read/write register. Every new value written to the increment register (Inc_reg) 420 is added to the pending register (Pend_reg) 440 as shown in the FIG. 4. The register #2 441 is operable as a read only register. The value within the pending register (Pend_reg) 440 indicates the number of packets to be transmitted by an input/output (I/O) device. The pending register (Pend_reg) 440 is decremented by one when a packet is completely transferred to the I/O device. When this occurs, a "packet transfer complete" interrupt is generated and transferred to a host central processing unit (CPU). When the pending register (Pend_reg) 440 is decreased to a value of zero, no DMA transfer command is issued to a DMAC as shown above in various embodiments of the invention. When this occurs, a "packet transfer complete" interrupt is also generated and transferred to the host CPU. A status bit is used in certain embodiments of the invention to indicate whether the pending register (Pend_reg) 440 does ort does not have a non-zero value.

The present value of pending register (Pend_reg) 440 is passed to a flow control state machine 490. A two bit control line is fed back to the MUX 430 to control the operation and selection the various cases of operation during packet-based data transmission within the COMM I/F transmit and receive DMA control 400.

The COMM I/F transmit and receive DMA control 400 is operable in various modes for packet-based data transmission. When a transmitter, operable in accordance with the present invention, is disabled while a transmit DMA is still in progress, the I/O device will finish transmitting the current packet-based data packet. A normal packet completion interrupt is issued whenever the last packet has been completely transmitted. The host CPU is then operable to determine the number of un-transmitted packets by reading the pending register (Pend_reg) 440. In this situation, the pending register (Pend_reg) 440 is reset by the host through a dedicated control bit.

There are four different cases that are handled by the COMM I/F transmit and receive DMA control 400, as shown by the nomenclature on the MUX 430. Case #1 shows the situation where a new value is written to the increment register (Inc_reg) 420, and no packet is transmitted. Case #2 shows the situation a new value is written to the increment register (Inc_reg) 420, and a packet is transmitted at the same time. Case #3 shows the situation no new value is written to the increment register (Inc_reg) 420, and a packet is transmitted at the same time. Case #4 shows the situation no new value is written to the increment register (Inc_reg) 420, and no packet is transmitted.

A decrement register (Dec_reg) 450 is employed, shown in a hardware implementation as a register #4 451. In addition, a pending register (Pend_reg) 470, is also employed within the COMM I/F transmit and receive DMA control 400, shown in a hardware implementation as a register #5 471. A MUX 460 is operable to accommodate four different cases that occur in the receive operation of the COMM I/F transmit and receive DMA control 400.

A DMAC receive channel is set up using a software that is operable to perform the COMM I/F transmit and receive DMA control 400. Whenever a complete packet is transferred to the host, the pending register (Pend_reg) 470 is increased by a value of one and an interrpt is generated and transferred to the host CPU. The register #5 471 is operable as a read only register. When the host if interrupted, the host reads the pending register (Pend_reg) 470 to determine how many un-read packets are in a buffer of the host. The host is operable to read the packets from the buffer of the host ranges from up to the current value stored in the pending register (Pend_reg) 470.

When reading of the packets is stopped, the host writes the decrement register (Dec_reg) 450 with the number of packets that have been read. The register #4 451 is operable as a read/write register. A peripheral device operable using the COMM I/F transmit and receive DMA control 400 decrements the decrement register (Dec_reg) 450 from the pending register (Pend_reg) 470 whenever a new number is written to the decrement register (Dec_reg) 450.

The COMM I/F transmit and receive DMA control 400 is operable in various modes for packet-based data transmission. When a receiver, operable in accordance with the present invention, is disabled while a receive DMA is still in progress, the peripheral device will finish receiving the current packet-based data packet and transferring it to the host buffer before issuing an interrupt. The host CPU is then operable to determine the number of un-read packets in the buffer by reading the pending register (Pend_reg) 470. In this situation, the pending register (Pend_reg) 470 is reset by the host through a dedicated control bit.

There are four different cases that are handled by the COMM I/F transmit and receive DMA control 400, as shown by the nomenclature on the MUX 460. Case #1 shows the situation where a new value is written to the decrement register (Dec_reg) 420, and no packet is received. Case #2 shows the situation a new value is written to the decrement register (Dec_reg) 450, and a packet is received at the same time. Case #3 shows the situation no new value is written to the decrement register (Dec_reg) 450, and a packet is received at the same time. Case #4 shows the situation no new value is written to the decrement register (Dec_reg) 450, and no packet is received.

Figure 5:
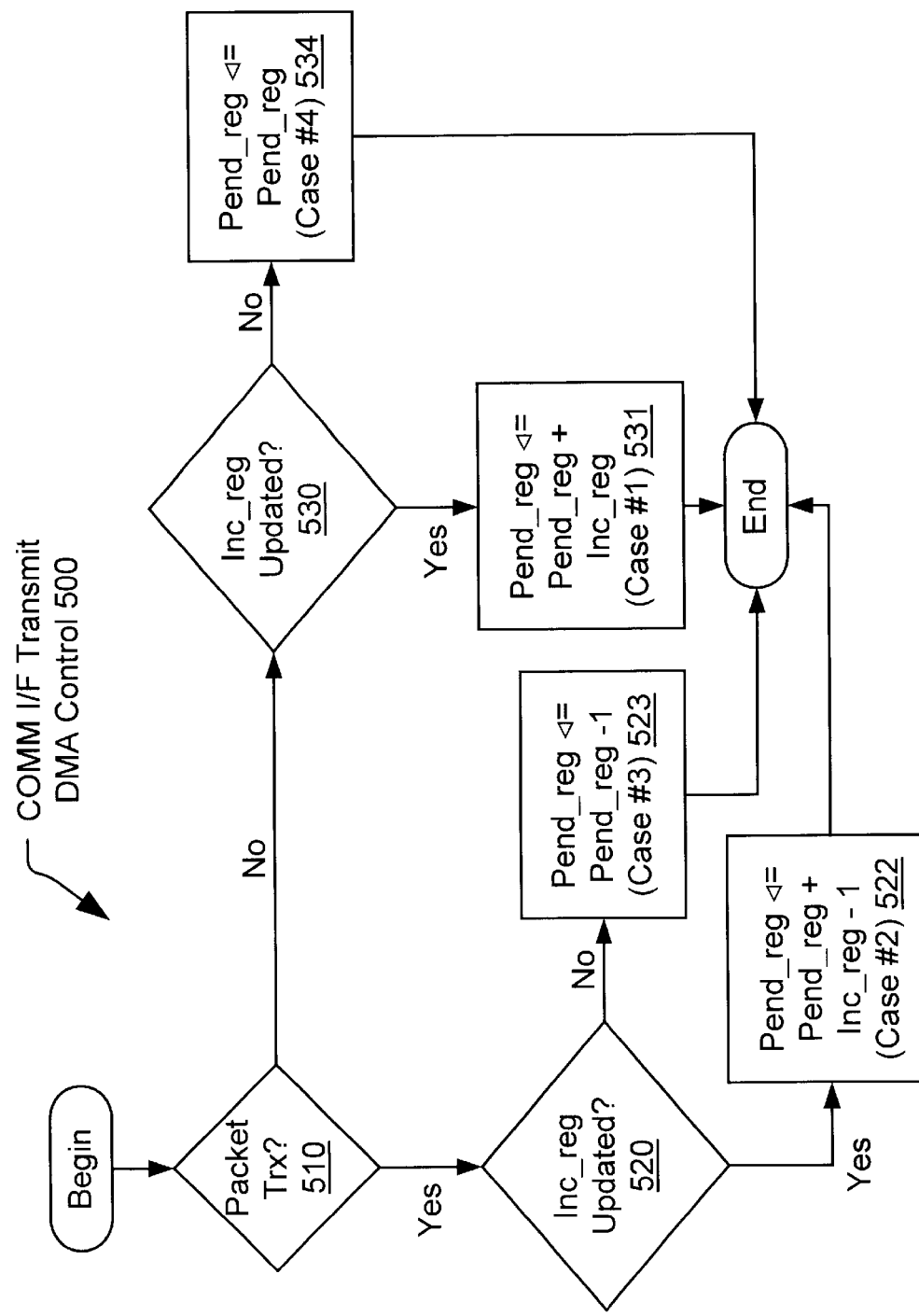
FIG. 5 is a illustrating an embodiment of a communication interface (COMM I/F) transmit direct memory access (DMA) control method performed in accordance with the present invention.

FIG. 5 is a illustrating an embodiment of a communication interface (COMM I/F) transmit direct memory access (DMA) control method 500 performed in accordance with the present invention. In a decision block 510, it is determined whether a packet is transmitted. If no packet is transmitted as determined in the decision block 510, then it is further determined in a decision block 530 whether an increment register (Inc_reg) has been updated. If the increment register (Inc_reg) has not been updated as determined in the decision block 530, then a value stored in a pending register (Pend_reg) remains unchanged. This situation is further illustrated as case #4 in the MUX 430 of the FIG. 4. If the increment register (Inc_reg) has been updated as determined in the decision block 530, then a value stored in a pending register (Pend_reg) in increased by a value stored in the increment register (Inc_reg) as shown in a block 531. This situation is further illustrated as case #1 in the MUX 430 of the FIG. 4.

However, if a packet has been transmitted as determined in the decision block 510, then it is further determined in a decision block 520 whether an increment register (Inc_reg) has been updated. If the increment register (Inc_reg) has not been updated as determined in the decision block 520, then a value stored in a pending register (Pend_reg) is decremented by a value of one as shown in a block 523. This situation is further illustrated as case #3 in the MUX 430 of the FIG. 4. If the increment register (Inc_reg) has been updated as determined in the decision block 520, then a value stored in a pending register (Pend_reg) in increased by a value stored in the increment register (Inc_reg) and also decremented by a value of one as shown in a block 522. This situation is further illustrated as case #2 in the MUX 430 of the FIG. 4.

Figure 6:
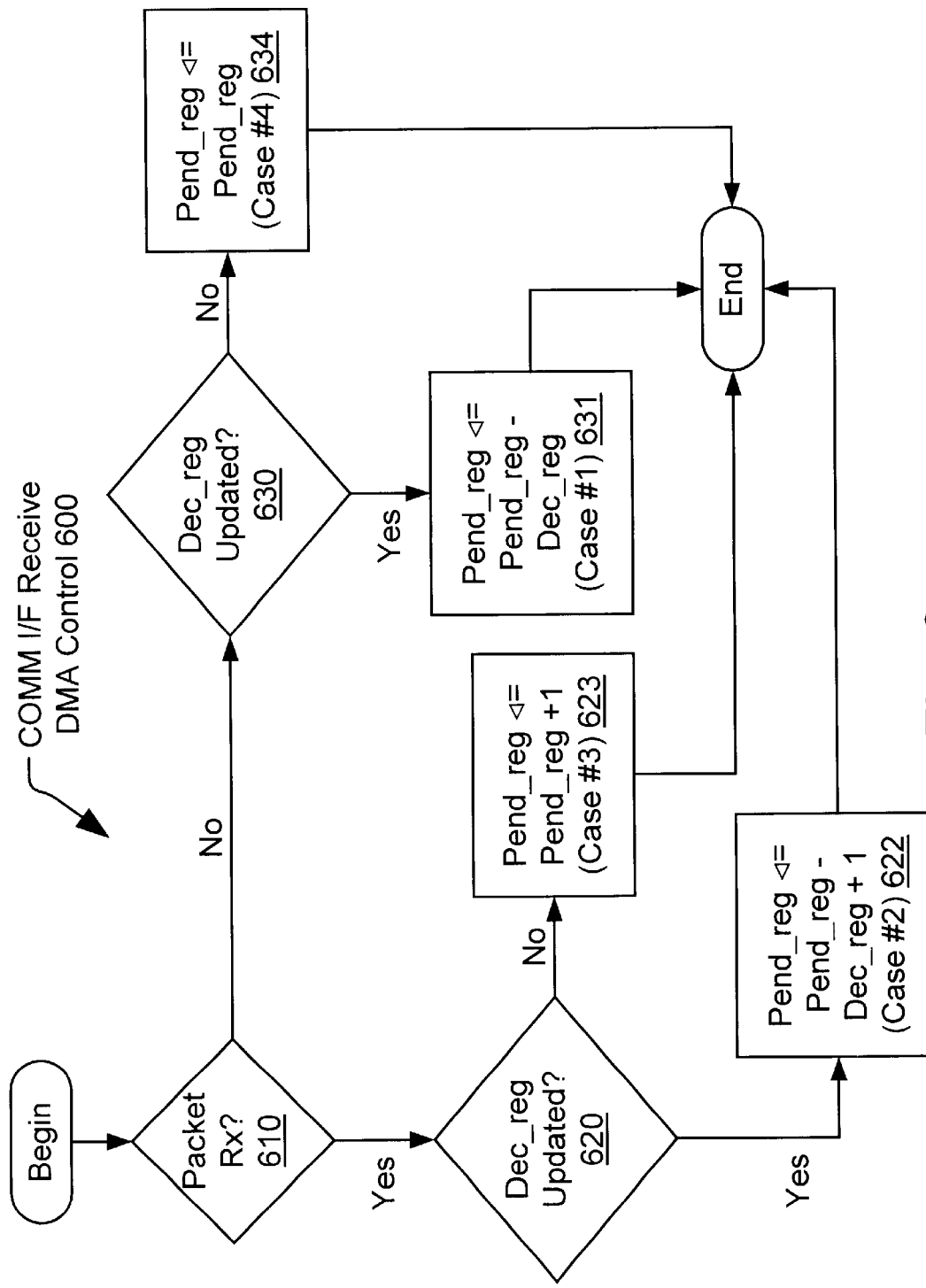
FIG. 6 is a illustrating an embodiment of a communication interface (COMM I/F) receive direct memory access (DMA) control method performed in accordance with the present invention.

FIG. 6 is a illustrating an embodiment of a communication interface (COMM I/F) receive direct memory access (DMA) control method 600 performed in accordance with the present invention. In a decision block 610, it is determined whether a packet is received. If no packet is received as determined in the decision block 610, then it is further determined in a decision block 630 whether a decrement register (Dec_reg) has been updated. If the decrement register (Dec_reg) has not been updated as determined in the decision block 630, then a value stored in a pending register (Pend_reg) remains unchanged. This situation is further illustrated as case #4 in the MUX 460 of the FIG. 6. If the decrement register (Dec_reg) has been updated as determined in the decision block 630, then a value stored in a pending register (Pend_reg) in decreased by a value stored in the decrement register (Dec_reg) as shown in a block 631. This situation is further illustrated as case #1 in the MUX 460 of the FIG. 6.

However, if a packet has been received as determined in the decision block 610, then it is further determined in a decision block 620 whether a decrement register (Dec_reg) has been updated. If the decrement register (Dec_reg) has not been updated as determined in the decision block 620, then a value stored in a pending register (Pend_reg) is incremented by a value of one as shown in a block 623. This situation is further illustrated as case #3 in the MUX 460 of the FIG. 6. If the decrement register (Dec_reg) has been updated as determined in the decision block 620, then a value stored in a pending register (Pend_reg) in decreased by a value stored in the decrement register (Dec_reg) and also incremented by a value of one as shown in a block 622. This situation is further illustrated as case #2 in the MUX 460 of the FIG. 6.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. A packet-based direct memory access system, comprising:
   a microchip circuitry, comprising a plurality of registers, that is operable to perform direct memory access of packet-based data, The packet-based data is either transferred to a device from the microchip circuitry to the device or received by the microchip circuitry from the device, the packet-based data comprises a plurality of packets;
   the plurality of registers comprises an increment register, a decrement register, a transmit pending register, and a receive pending register;
   a flow control state machine that is operable to generate commands to control whether a packet of the plurality of packets is transmitted to the device from the microchip circuitry or whether a packet of the plurality of the plurality of packets is received by the microchip circuitry from the device;
   the flow control state machine is operable to control modification of values stored in the increment register and the transmit pending register during the transmission to the device from the microchip circuitry; and
   the flow control state machine is operable to control modification of values stored in the decrement register and the receive pending register during the receipt by the microchip circuitry from the device, wherein the flow control state machine is operable to control an increase of a value stored in the transmit pending register by a value stored in the increment register when no packet is transmitted to the device from the microchip circuitry and the increment register is updated;
   the flow control state machine is operable to control a decease of a value stored in the transmit pending register by one when a packet is transmitted to the device from the microchip circuitry and the increment register is not updated; and
   the flow control state machine is operable to control a decrease of a values stored in the transmit pending register by one and increases the value stored in the receive pending register by a value stored in the increment register when a packet is transmitted to the device from the microchip circuitry and the increment register is updated.

2. The packet-based direct memory access system of claim 1, wherein the microchip circuitry comprises a direct memory access interface and the flow control state machine;
   the direct memory access interface is operable to perform the receipt of the packet-based data by the microchip circuitry from the device; and
   the direct memory access interface is operable to perform the transmission of the packet-based data from the microchip circuitry to the device.

3. The packet-based direct memory access system of claim 1, wherein the device is an asynchronous digital subscriber loop modem.

4. The packet-based direct memory access system of claim 1, wherein the microchip circuitry further comprises:
   a system bus;
   a plurality of system device, each system device is communicatively coupled to the system bus;
   a peripheral bus that is communicatively coupled to the system bus via a bus bridge; and
   a communication interface circuitry, communicatively coupled to the peripheral bus, the communication interface circuitry comprises a direct memory access interface and the flow control state machine.

5. The packet-based direct memory access system of claim 1, wherein the packet-based data comprises asynchronous transfer mode cell-based asynchronous digital subscriber loop data having a plurality of packets, each packet having a predetermined size.

6. The packet-based direct memory access system of claim 1, wherein the packet-based data comprises universal serial bus data having a plurality of packets, each packet having a predetermined size.

7. A packet-based direct memory access system, comprising:
   a microchip circuitry, comprising a plurality of registers, that is operable to perform direct memory access of packet-based data, the packet-based data is either transferred to a device from the microchip circuitry to the device or received by the microchip circuitry from the device, the packet-based data comprises a plurality of packets;
   the plurality of registers comprises an increment register, a decrement register, a transmit pending register, and a receive pending register;
   a flow control state machine that is operable to generate commands to control whether a packet of the plurality of packets is transmitted to the device from the microchip circuitry or whether a packet of the plurality of the plurality of packets is received by the microchip circuitry from the device;
   the flow control state machine is operable to control modification of values stored in the increment register and the transmit pending register during the transmission to the device from the microchip circuitry; and the flow control state machine is operable to control modification of values stored in the decrement register and the receive pending register during the receipt by the microchip circuitry from the device, wherein the flow control state machine is operable to control a decrease a value stored in the receive pending register by a value stored in the decrement register when no packet is received by the microchip circuitry from the device and the decrement register is updated;

the flow control state machine is operable to control an increase of a value stored in the receive pending register by one when a packet is received by the microchip circuitry from the device and the decrement register is not updated; and the flow control state machine is operable to control an increase a value stored in the receive pending register by one and decreases the value stored in the transmit pending register by a value stored in the decrement register when a packet is received by the microchip circuitry from the device and the decrement register is updated.

8. The packet-based direct memory access system of claim 7, wherein the microchip circuitry comprises a direct memory access interface and the flow control state machine;

the direct memory access interface is operable to perform the receipt of the packet-based data by the microchip circuitry from the device; and the direct memory access interface is operable to perform the transmission of the packet-based data from the microchip circuitry to the device.

9. The packet-based direct memory access system of claim 7, wherein the device is an asynchronous digital subscriber loop modem.

10. The packet-based direct memory access system of claim 7, wherein the microchip circuitry further comprises:

a system bus;

a plurality of system device, each system device is communicatively coupled to the system bus;

a peripheral bus that is communicatively coupled to the system bus via a bus bridge; and a communication interface circuitry, communicatively coupled to the puerperal bus, the communication interface circuitry comprises a direct memory access interface and the flow control state machine.

11. The packet-based direct memory access system of claim 7, wherein the packet-based data comprises asynchronous transfer mode cell-based asynchronous digital subscriber loop data having a plurality of packets, each packet having a predetermined size.

12. The packet-based direct memory access system of claim 7, wherein the packet-based data comprises universal serial bus data having a plurality of packets, each packet having a predetermined size.

13. A method to perform packet-based direct memory access, the method comprising:

determining whether a packet of the packet-based data has been transmitted;

determining whether a packet of the packet-based data bas been received;

selectively controlling values stored in an increment register and a transmit pending register based on transmission of a packet of the packet-based data;

selectively controlling values stored in a decrement register and a receive pending register based on receipt of the packet of the packet-based data;

determining when the increment register is updated;

increasing a value stored in the transmit pending register by a value stored in the increment register when no packet is transmitted and the increment register is updated;

decreasing a value stored in the transmit pending register by one when a packet is transmitted and the increment register is not updated; and decreasing a value stored in the transmit pending register by one and increasing the value stored in the transmit Reading register by a value stored in the increment register when a packet is transmitted and the increment register is updated.

14. The method of claim 13, wherein the packer-based data comprises asynchronous transfer mode cell-based asynchronous digital subscriber loop data having a plurality of packets, each packet having a predetermined size.

15. The method of claim 13, wherein the packet-based data comprises universal serial bus data having a plurality of packets, each packet having a predetermined size.

16. A method to perform packet-based direct memory access, the method comprising:

determining whether a packet of the packet-based data has been transmitted;

determining whether a packet of the packet-based data has been received;

selectively controlling values stored in an increment register and a transmit pending register based an transmission of a packet of the packet-based data;

selectively controlling values stored in a decrement register and a receive pending register based on receipt of the packet of the packet-based data;

determining when the decrement register is updated;

decreasing a value stored in the receive pending register by a value stored in the decrement register when no packet is received and the decrement register is updated;

increasing a value stored in the receive pending register by one when a packet is received and the decrement register is not updated; and increasing a value stored in the receive pending register by one and decreasing the value stored in the receive pending register by a value stored in the decrement register when a packet is received and the decrement register is updated.

17. The method of claim 16, wherein the packet-based data comprises asynchronous transfer mode cell-based asynchronous digital subscriber loop data having a plurality of packets, each packet having a predetermined size.

18. The method of claim 16, wherein the packer-based data comprises universal serial bus data having a plurality of packets, each packet having a predetermined size.

19. A direct memory access system comprising:

a transmit increment register;

a transmit pending register;

a transmit multiplexer coupled to the transmit increment register and the transmit pending register;

a receive decrement register;

a receive pending register;

a receive multiplexer coupled to the receive decrement register and the receive pending register;

a flow control state machine coupled to the transmit increment register, the transmit pending register, the transmit multiplexer, the receive decrement register, the receive pending register and the receive multiplexer, the flow control state machine generating transmit multiplexer control data and receive multiplexer control data based on the state of the transmit increment register, the transmit pending register, the receive decrement register, and the receive pending register;

wherein the transmit multiplexer further performs a plurality of cases, including a first case that results in a new value written to the receive decrement register when no packet is received, a second case that results in a new value written to the receive decrement register when a packet is received, a third case that results in no new value written to the receive decrement register when a packet is received, and a fourth case that results in no new value written to the receive decrement register when no packet is received.

* * * * *